Feb. 7, 1967 W. F. HURLBURT, JR 3,302,912
MOUNTING BRACKET FOR VALVES
Filed July 7, 1965
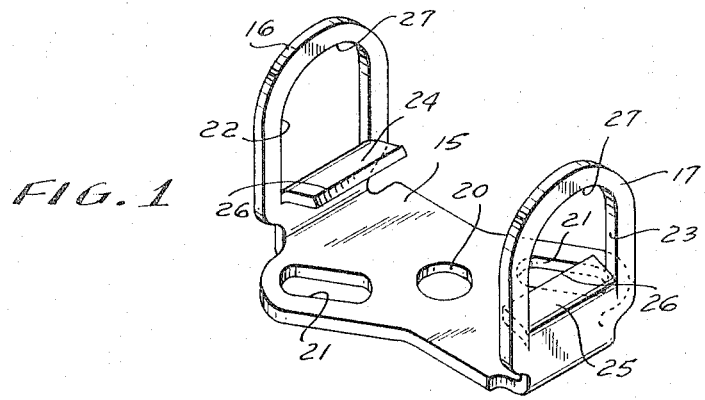
FIG.1
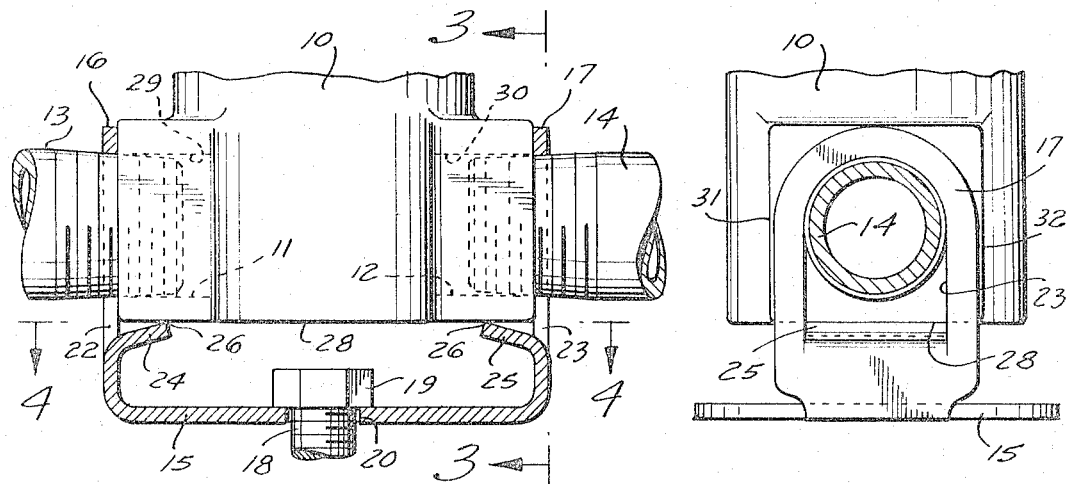
FIG.2
FIG.3
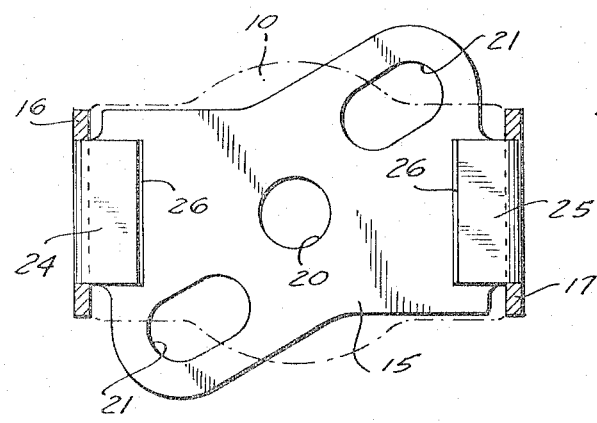
FIG.4
INVENTOR:
WILBUR F. HURLBURT, JR.
BY
Breitenfeld & Levine
ATTORNEYS

United States Patent Office 3,302,912
Patented Feb. 7, 1967

3,302,912
MOUNTING BRACKET FOR VALVES
Wilbur F. Hurlburt, Jr., Morristown, N.J., assignor to Automatic Switch Company, Florham Park, N.J., a corporation of New York
Filed July 7, 1965, Ser. No. 470,098
4 Claims. (Cl. 248—65)

This invention relates generally to the mounting of valves on support surfaces, and more particularly to a mounting bracket for supporting a valve which is operatively connected in a fluid line.

Conventionally, the bodies of valves are formed with exterior integral mounting portions provided with tapped, i.e., integrally threaded, holes which are used to mount the valve on some suitable support surface adjacent to the fluid line in which the valve is connected. These mounting portions represent excess material from the point of view of valve operation, since their only purpose is to serve as a means for securing the valve to a support. Nevertheless, they add substantially to the cost of manufacturing the valve body.

It is a principal object of the present invention to provide a bracket, for supporting a valve, which can be produced for a fraction of the cost of providing mounting portions having tapped holes on valve bodies.

It is another object of the invention to provide such a bracket which may also be used with conventional valves whose bodies are provided with mounting portions.

It is a further object of the invention to provide such a bracket which can, with equal efficiency, be mounted on either a horizontal or vertical support surface adjacent to the valve.

It is another object of the invention to provide such a bracket capable of being mounted on a support even though there is access only to the face of the support against which the bracket is mounted, and no access to the opposite face of the support.

An advantage of the bracket according to this invention is that it permits the removal and replacement of the valve being supported without disturbing the screws or other fasteners by means of which the valve is mounted.

An additional advantage of the bracket of this invention is that it may be affixed to the support surface at a predetermined location before the valve is actually installed in the fluid-carrying line.

According to the present invention, the bracket is provided with a base, adapted to be secured to a support surface by suitable fasteners, and at least two upstanding arms fixed to the base. The arms are spaced apart a distance sufficient to accommodate between them the body of the valve to be supported. Each arm is provided with a hole in registry with one of the valve ports to permit the fluid-carrying conduits to pass through the arms and into the ports. Each arm, therefore, completely surrounds its respective conduit and prevents removal of the valve from between the bracket arms. According to a particular feature of the invention, each arm is provided with an inwardly-projecting, somewhat yieldable, tab spaced above the base of the bracket and arranged at an acute angle to the hole-bearing portion of the arm. The spacing between the free ends of the tabs and the far edges of the holes in their respective arms is so related to the dimensions of the valve body and conduits extending from it that the valve body is pressed against the tabs causing them to yield slightly, thereby enabling the bracket to grip the valve body and conduits tightly. In addition, since the valve body is spaced above the base of the bracket, it does not interfere with the fasteners which hold the bracket on the support surface.

It should be pointed out that the present invention goes beyond the idea of mounting a valve by means which engage the valve body exclusively. The bracket of this invention takes advantage of the presence of the conduits extending from the valve, and engages the conduits at points adjacent to the valve for the purpose of mounting the valve on a support surface.

Other objects and advantages of the invention will be apparent from the following detailed description in which reference is made to the accompanying drawings.

In the drawings:

FIG. 1 is a perspective view of an illustrative bracket according to the present invention;

FIG. 2 is a cross-sectional view along the longitudinal center-line of the bracket, showing an illustrative valve within the bracket;

FIG. 3 is a cross-sectional view taken on line 3—3 of FIG. 2; and

FIG. 4 is a cross-sectional view taken on line 4—4 of FIG. 2.

The bracket of this invention is intended for use with a valve having a body 10 formed with at least two ports 11 and 12, into which the free ends of conduits 13 and 14, respectively, are inserted. The free ends of the conduits may be brazed to the valve body, or as shown in the drawings, they may be provided with external threads which cooperate with the internal threads of the ports. The valve may be of the manually operated type, the solenoid operated type, or any other well known type.

The bracket chosen to illustrate this invention comprises, generally, a base 15 having a pair of upstanding arms 16 and 17 at its ends. The base 15 is provided with a center opening 20, and two elongated openings 21 symmetrically arranged with respect to the center opening. The openings 20 and 21 are adapted to accommodate fasteners, such as screws 18 (FIG. 2) by means of which the bracket is mounted on a support surface.

Each of the arms 16 and 17 is formed with a central hole 22 and 23, respectively, large enough to accommodate the fluid-carrying conduits 13 and 14 extending from the valve body 10. In addition, the arms 16 and 17 are spaced apart a distance sufficient to permit the valve body 10 to be placed between them (see FIG. 2), and holes 22 and 23 are so located that, with the valve body between the arms, they register with the ports 11 and 12, respectively.

The lower edge of the hole 22 in arm 16 is formed with an extension constituting an inwardly-projecting tab 24. The lower edge of the hole 23 is similarly formed with an inwardly-projecting tab 25. Each tab is spaced above the base 15, and extends at an acute angle to the hole-bearing portion of its respective arm 16 or 17. Thus, the free ends 26 of the tabs 24 and 25 are spaced farther from the base 15 than are the ends connected to the arms from which the tabs project. Consequently, as may be seen clearly in FIG. 2, a valve body 10 arranged between the arms 16 and 17 rests upon the free ends 26 of the tabs 24 and 25, and is spaced above the base 15. This space provides room for the heads 19 of screws 18, or equivalent fastener parts.

As is apparent from the drawings, the base 15, arms 16 and 17, and tabs 24 and 25, may conveniently be integrally formed, in a rapid stamping operation, from a single piece of material, such as a suitable metal. Furthermore, the bracket need not be provided with any tapped holes. Consequently, the present bracket is very inexpensive to produce.

In use, the bracket is mounted on a support surface at a point where a valve is to be located in the finished fluid-carrying line. Advantageously, the center opening 20 in the base 15 is placed on the center line of the bracket, so that alignment of the opening 20 with the center lines of the conduits when the bracket is mounted insures that the center line of the valve to be arranged in the bracket will be colinear with the center lines of the conduits. The valve body 10 is then inserted between the arms 16 and 17, and the face 28 of the body comes to rest on the free ends 26 of the tabs. At this point, before the conduits are connected to the valve, the spacing between the free end 26 of each tab and the far edge 27 (see FIG. 1) of the hole in its respective arm is slightly less than the distance between the face 28 of the valve body and the far sides 29 and 30 of the ports 11 and 12. The distances referred to above are all vertical distances in FIG. 2.

The threaded ends of conventional plumbing conduits are, of course, tapered. Consequently, the endmost, and hence smallest diameter, portion of the threaded end of each of the conduits 13 and 14 can relatively easily be slipped through the holes 22 and 23 and into their respective ports 11 and 12. However, as each conduit is threaded into its port, its tapered surface engages the inner edge 27 of its respective hole 22 or 23, and by means of a camming action presses the face 28 of the valve body against the tabs 24 and 25, thereby causing the tabs to yield slightly toward the base 15. Thus, when the conduit connections to the valve have been completed, the valve body 10 and its associated conduits 13 and 14 are tightly gripped between the free ends 26 of the tabs and the inner edges 27 of the holes in the arms 16 and 17.

Although threaded conduits and ports are shown in the drawings, the bracket can also be employed with installations in which the conduits are brazed to the ports of the valve body. In such a case, the valve body may be pressed toward the base 15, to cause the tabs to yield slightly, during the brazing operation. Thereafter, when the valve body is released, the tabs will tend to spring away from the base 15 and hence cause the conduits to be pressed against the edges 27 of holes through which they extend.

As shown in FIGS. 2 and 3, the base 15 is mounted in a horizontal plane. If the nearest convenient support surface is a vertical surface, the bracket can readily be rotated 90° in either direction, as viewed in FIG. 3, without necessitating any change in orientation of the valve. In such a case, the tabs 24 and 25 will engage the surface 31 of the body 10, if the bracket is rotated in a clockwise direction, or they will engage the surface 32, if the bracket is rotated in a counterclockwise direction.

It should be pointed out that the valve body 10 shown in the drawings is not formed with conventional mounting portions having tapped holes. However, obviously the present bracket can be used with valve bodies so formed, since the mounting portions in no way interfere with the interengagement of the valve body and bracket. Furthermore, it will be appreciated that the valve body 10 can be removed from the bracket without disturbing the fasteners 18 by means of which the bracket is mounted to a support surface.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A mounting bracket for use with a valve having a body provided with ports, and conduits extending from the ports, comprising:
    (a) a bracket base provided with means for mounting the bracket on a supporting surface and
    (b) at least two upstanding arms secured to said base,
        (I) said arms being spaced apart a distance sufficient to accommodate the valve body between them with one of the ports facing each arm,
        (II) each arm having a hole in registry with its respective valve port to permit the conduit extending from that port to pass through the arm, whereby each arm completely surrounds its respective conduit and thereby prevents removal of the valve from between the bracket arms, and
    (c) a tab projecting inwardly from each arm, each tab being located between the hole in its respective arm and said base but being spaced from said base, and each tab being adapted to support the valve body arranged between said arms, whereby the valve body is supported in spaced relation to said base so as not to interfere with fasteners cooperating with the mounting means in said base.

2. A bracket as defined in claim 1 wherein said base, arms, and tabs are formed from a single piece of bendable material.

3. A bracket as defined in claim 1 wherein said tabs are arranged at an acute angle to the hole-bearing portions of their respective arms so that their free ends are spaced farther from said base than their ends connected to said arms whereby the free ends of the tabs engage the valve body between said arms, said tabs being yieldable to a slight extent in the direction of said base, and the distance between the free end of each tab and the edge of the hole, in its respective arm, farthest from it is slightly less than the distance between the surface of the valve body engaging said tab and the far side of the conduit passing through said hole, whereby said tab must yield slightly when the valve and conduits are fitted into the bracket thereby causing the bracket to hold the valve and conduits tightly.

4. A mounting bracket for use with a valve having a body provided with internally-threaded ports, and conduits having tapered, externally-threaded ends extending from the ports, comprising:
    (a) a bracket base adapted to be mounted on a supporting surface,
    (b) at least two upstanding arms secured to said base, said arms being spaced apart a distance sufficient to accommodate the valve body between them with one of the ports facing each arm,
    (c) a hole in each arm in registry with its respective port, and
    (d) a yieldable tab projecting inwardly from each arm at an acute angle to the hole-bearing portion of said arm, the spacing between the free end of each tab and the far edge of the hole in its respective arm being slightly less than the distance between the surface of the valve engaging said tab and the far side of its respective port,
whereby as the tapered ends of the conduits are threaded into the ports they will cam said arms in a direction away from said base and thereby press the valve body against said tabs and cause the latter to yield.

References Cited by the Examiner

UNITED STATES PATENTS

| | | | |
|---|---|---|---|
| 1,802,965 | 4/1931 | Brady | 248—67.7 |
| 2,932,314 | 4/1960 | Stephens | 137—351 |
| 3,232,568 | 2/1966 | Lennon et al. | 248—67 |

CLAUDE A. LE ROY, *Primary Examiner.*

J. F. FOSS, *Assistant Examiner.*